(12) United States Patent
Pont et al.

(10) Patent No.: US 11,128,839 B2
(45) Date of Patent: Sep. 21, 2021

(54) IMAGE PROCESSING TO IDENTIFY CONDITIONS OF INTEREST WITHIN SELF-SERVICE TERMINALS

(71) Applicant: NCR Corporation, Duluth, GA (US)

(72) Inventors: Derek Pont, Invergowrie (GB); Gordon Walker, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 1009 days.

(21) Appl. No.: 15/011,432

(22) Filed: Jan. 29, 2016

(65) Prior Publication Data

US 2017/0221295 A1   Aug. 3, 2017

(51) Int. Cl.
  *H04N 7/18* (2006.01)
  *G06Q 20/18* (2012.01)
  *G07F 19/00* (2006.01)

(52) U.S. Cl.
  CPC ............. *H04N 7/183* (2013.01); *G06Q 20/18* (2013.01); *G07F 19/205* (2013.01); *G07F 19/207* (2013.01)

(58) Field of Classification Search
  CPC .. G06Q 20/1085; G06Q 20/18; G06Q 20/223; G07F 19/205; G07F 19/207; H04N 7/183
  USPC .......................................................... 705/43
  See application file for complete search history.

(56) References Cited

U.S. PATENT DOCUMENTS

| | | | | |
|---|---|---|---|---|
| 6,583,813 B1 * | 6/2003 | Enright | ............... | G06Q 20/18 348/143 |
| 7,230,223 B2 * | 6/2007 | Jespersen | ............... | G07D 11/23 250/206.1 |
| 9,098,961 B1 * | 8/2015 | Block | ............... | G07F 19/206 |
| 2004/0158499 A1 * | 8/2004 | Dev | ............... | G06Q 30/02 705/26.1 |
| 2009/0212105 A1 * | 8/2009 | Couper | ............... | G06Q 20/105 235/379 |
| 2010/0230486 A1 * | 9/2010 | Smith | ............... | G06Q 20/1085 235/379 |
| 2012/0038775 A1 * | 2/2012 | Priesterjahn | ............... | G07F 19/207 348/150 |
| 2012/0044154 A1 * | 2/2012 | Black | ............... | G07F 19/205 345/173 |
| 2014/0107836 A1 * | 4/2014 | Crews | ............... | G07F 19/206 700/236 |
| 2015/0100416 A1 * | 4/2015 | Blackhurst | ......... | G06Q 30/0253 705/14.51 |

* cited by examiner

*Primary Examiner* — Scott C Anderson
(74) *Attorney, Agent, or Firm* — Schwegman, Lundberg & Woessner

(57) ABSTRACT

Various embodiments herein each include at least one of devices, methods, and software for image processing to identifying conditions of interest within SSTs, such as ATMs and self-checkout POS terminals. Conditions of interest may include media misalignment within media cassettes, such as currency, and items within an SST reject bin that have not been removed when the SST is being serviced. One method embodiment includes receiving an image from an imaging device located within an SST, the image including a view of at least one area of interest within the SST. This method further includes processing the image to detect presence of a condition of interest within at least one of the at least one areas of interest and generating and providing an alert of a detected presence of the condition of interest with regard to at least one of the areas of interest.

20 Claims, 4 Drawing Sheets

IMAGE PROCESSING TO IDENTIFY CONDITIONS OF INTEREST WITHIN SELF-SERVICE TERMINALS

BACKGROUND INFORMATION

Self-Service Terminals (SSTs), such as Automated Teller Machines (ATMs) and self-checkout point-of-sale (POS) terminals, have been deployed in great numbers to provide services to customers in many locations. When SSTs encounter media jams or otherwise are not serviced properly, the SST is more likely to experience an error condition that will take the SST out of service. When an SST is out of service, personnel typically must physically service the SST to correct the error, such as clearing a media jam, to bring the SST back into service. This can result is suboptimal customer service and added expense in servicing the SST.

SUMMARY

Various embodiments herein each include at least one of devices, methods, and software for image processing to identifying conditions of interest within SSTs, such as ATMs and self-checkout POS terminals. Conditions of interest may include media misalignment within media cassettes, such as currency, and items within an SST reject bin that have not been removed when the SST is being serviced.

One method embodiment includes receiving an image from an imaging device located within an SST, the image including a view of at least one area of interest within the SST. This method further includes processing the image to detect presence of a condition of interest within at least one of the at least one areas of interest and generating and providing an alert of a detected presence of the condition of interest with regard to at least one of the areas of interest.

Another method embodiment includes capturing, by a camera, an image within a housing of an SST including at least one area of interest and then comparing, by a computer that controls operation of the SST, the captured image with at least one dataset defining an alert condition to be detected with regard to each of the at least one areas of interest. This method then outputs an alert corresponding to an alert condition with regard to an area of interest of the at least one areas of interest upon identifying the alert condition with regard to the area of interest.

A further embodiment is an SST that includes at least one media cassette to hold media to be dispensed from the SST, each of the at least one media cassettes providing a view of media when held therein. The SST also includes an imaging device positioned within the SST to capture images of a field of view including a view of media held within each of the at least one media cassettes. Additionally, the SST includes an area of interest monitoring process stored in a memory of a computer controlling operation of the SST. In some embodiments, the area of interest monitoring process is executable by a processor of the computer to perform data processing activities. These data processing activities, in some embodiments, include receiving an image from the camera and processing the image to detect presence of a media stacking condition of interest within at least one of the at least one media cassettes. The data processing activities may then generate and provide an alert of a detected presence of the condition of interest with regard to at least one of the at least one media cassettes.

DETAILED DESCRIPTION

Figure 1:
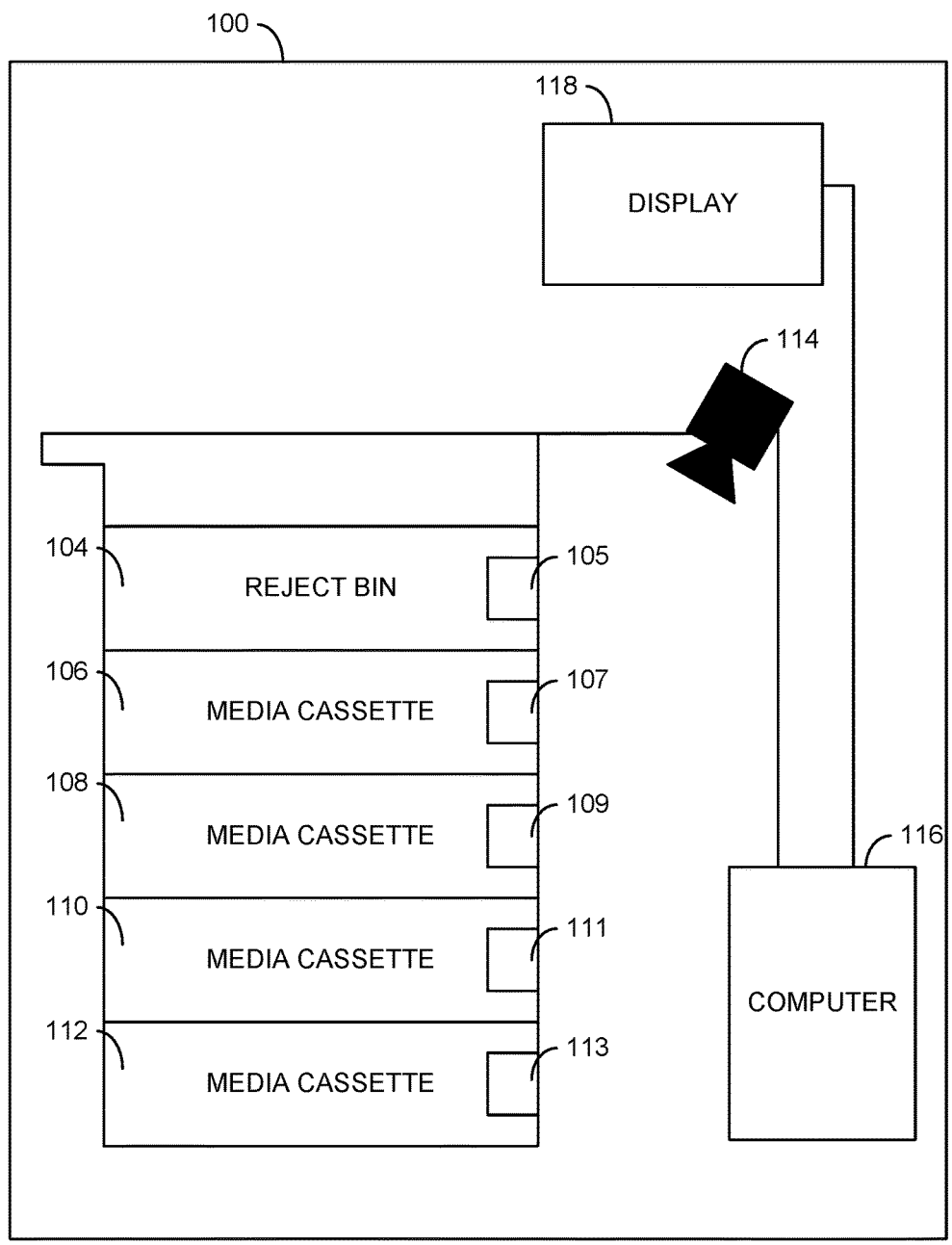
FIG. 1 is a logical block diagram of a Self-Service Terminal, according to an example embodiment.

Various embodiments herein each include at least one of systems, methods, and software to process images captured of modules within an SST, such images of media cassettes that hold media, such as currency, and a reject bin that hold items retained by an SST, to identify conditions within the SST that may lead to the SST having to be taken out of service until maintenance personnel correct the condition. For example, when currency held within a cassette is not stacked consistently, the currency may not be picked properly for dispensing such that it may lead to a jam within the SST. Further, a reject bin should be emptied when the SST is serviced. The various embodiments herein may be performed at or near the end of servicing an SST, such as when a housing door is closed, upon insertion of a removable cassette, or at another point in the servicing process. Other embodiments may also or alternatively be performed during operation of the SST to ensure the SST remains in a proper state. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of an SST 100, according to an example embodiment. The SST 100 may be an ATM, a self-service checkout POS terminal, and other such terminals. The SST 100 includes a reject bin 104 and media cassettes 106, 108, 110, 112.

The reject bin 104 is a location within the SST where media items from the media cassettes may be placed when an error condition in feeding media through the SST is detected or an issue with regard to the media item is detected. Also, bankcards that are retained by the SST may be placed in the reject bin 104.

The media cassettes 106, 108, 110, 112 are cassettes within which media dispensed by the SST is held in stacks. The stacks may be held horizontally, vertically, or elsewise in different embodiments and SST 100 arrangements. The media may be currency, postage, certificates of value, and the like. The media cassettes 106, 108, 110, 112 may be permanently installed or be removable in various embodiments.

The reject bin 104 and the media cassettes 106, 108, 110, 112 each include an area 105, 107, 109, 111, 113, respectively, that presents a view of the contents therein. The areas 105, 107, 109, 111, 113 may transparent enclosure portions of the cassettes made of suitable transparent material, such as transparent plastics, glass, and other similar materials. In other embodiments, the areas 105, 107, 109, 111, 113 may openings in the reject bin 104 and cassettes 106, 108, 110, 112. In other embodiments the areas 105, 107, 109, 111, 113 of the reject bin 104 and media cassettes 106, 108, 110, 112 may be different from one another between transparent enclosures and openings in any combination.

Regardless of the configuration of the areas 105, 107, 109, 111, 113, the areas 105, 107, 109, 111, 113 provide a view of the contents of the reject bin 104 and the media cassettes 106, 108, 110, 112 to a camera 114 included within the SST 100. The camera 114 is positioned to provide the view of the contents of the reject bin 104 and the media cassettes 106, 108, 110, 112. The camera 114 is an imaging device that captures still or moving pictures. The camera 114 may also include or be accompanied with one or more lighting elements that illuminates an interior of the SST 114 to allow capture of a view of the contents of the reject bin 104 and the media cassettes 106, 108, 110, 112 through the areas 105, 107, 109, 111, 113.

Images captured by the camera 114 are communicated to a computer 116 that controls operation of the SST 100. A process that executes on the computer receives the images and processes the images to identify one or more conditions of interest within one or more areas of interest. The conditions of interest may be the presence of one or more items within the reject bin 104. The conditions of interest may also or alternatively be an arrangement of media within the media cassettes, such as a misalignment of currency or other media within a stack of a media cassette, the presence of one or more bands around a bundle of currency in a media cassette, and other conditions that may be identified within a captured image.

The conditions of interest may be defined in data stored in memory as image characteristics that can be identified within an image, as reference images for comparison to images captured by the camera 114, and the like. Some embodiments may utilize scoring algorithms to score similarity of the comparisons or other processing and threshold for declaring when there is a match or likely with a condition of interest. Other embodiments may also or alternatively utilize image subtraction. For example, a reference image of the reject bin 104 may be stored for comparison with newly captured images from the camera 114. One image may be subtracted from the other and the result when including at least a certain number of remaining pixels may identify that there is something present in the reject bin 104 and therefore indicate a need for a notice or reminder that the reject bin 104 needs to emptied.

When a condition of interest is identified, one embodiment includes providing a visible notice via a display device 118 coupled to the computer 116. This notice may be provided following closure of a housing of the SST 100 during servicing of the SST 110. In other embodiments, depending on the identified condition of interest, a notice may be provided otherwise, such as via a network to responsible personnel, as an audible alert via an audio output device, or as an indication that a particular media cassette 104, 106, 108, 110, 112 is to be taken offline to avoid causing a jam within a media dispensing path of the SST 100. This indication that a particular media cassette 104, 106, 108, 110, 112 is to be taken offline may be provided to another process responsible for taking the media cassette 104, 106, 108, 110, 112 offline.

In a further embodiment, the condition of interest may be identified with regard to a location within a media stack present within a particular media cassette 104, 106, 108, 110, 112. This may inform the process responsible for taking the particular media cassette 104, 106, 108, 110, 112 offline that the media cassette should be take offline after a certain number of media items have been dispensed. This may be utilized when an identified condition identifies that a band that bundles currency has not been removed. In yet another embodiment, when such a condition of interest is identified, such as a band bundling an amount of currency, the condition notice informs the process that the condition is to be monitored going forth and the particular media cassette taken offline when the band is later identified as being within a certain proximity of a dispensing point.

Figure 2:
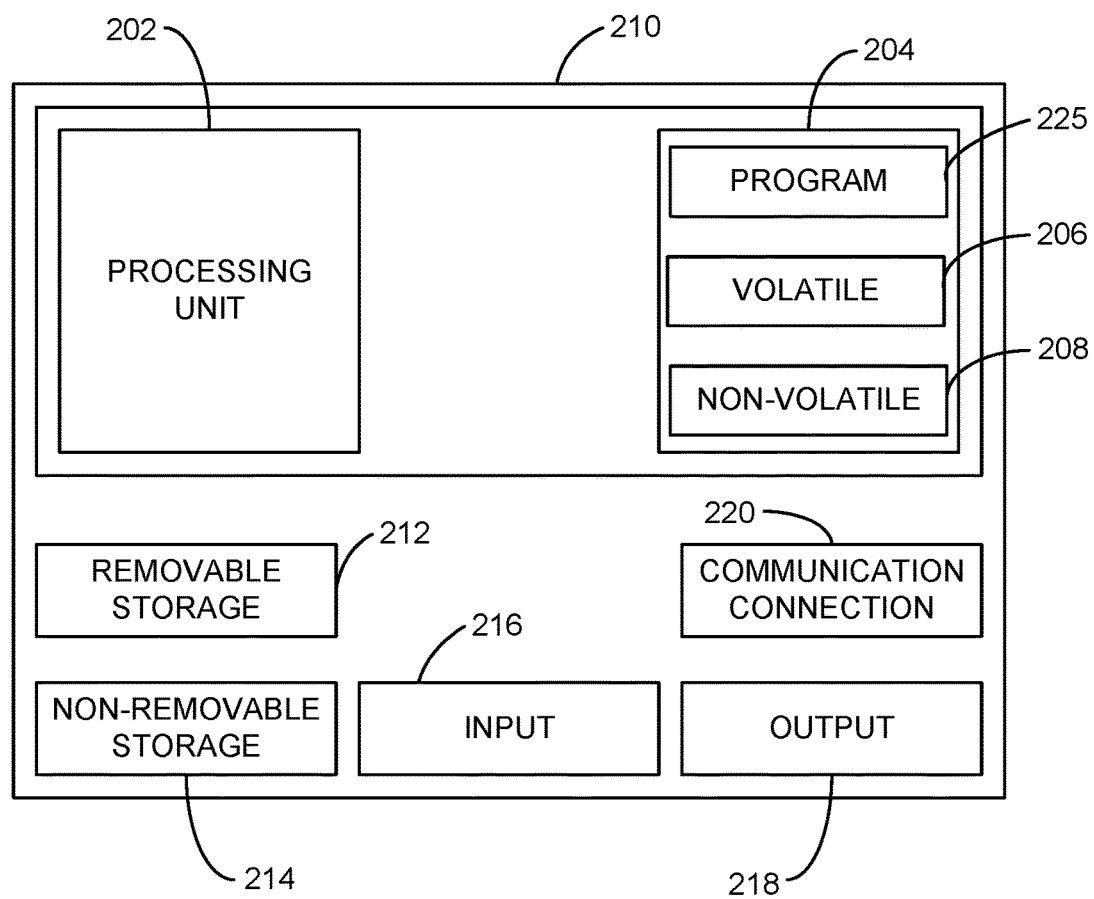
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. The computing device of FIG. 2 may take different forms in individual and different embodiments. For example, a computer of the ATM, a computer of a POS terminal, and the like, such as computer 116 of the SST 100 of FIG. 1. One example computing device in the form of a computer 210, may include a processing unit 202, memory 204, removable storage 212, and non-removable storage 214. Further, although the various data storage elements are illustrated as part of the computer 210, the storage may also or alternatively include cloud-based storage accessible via a network, such as the Internet.

Memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or is accessible via a web browser, may be stored on a non-transitory computer-readable medium.

Figure 3:
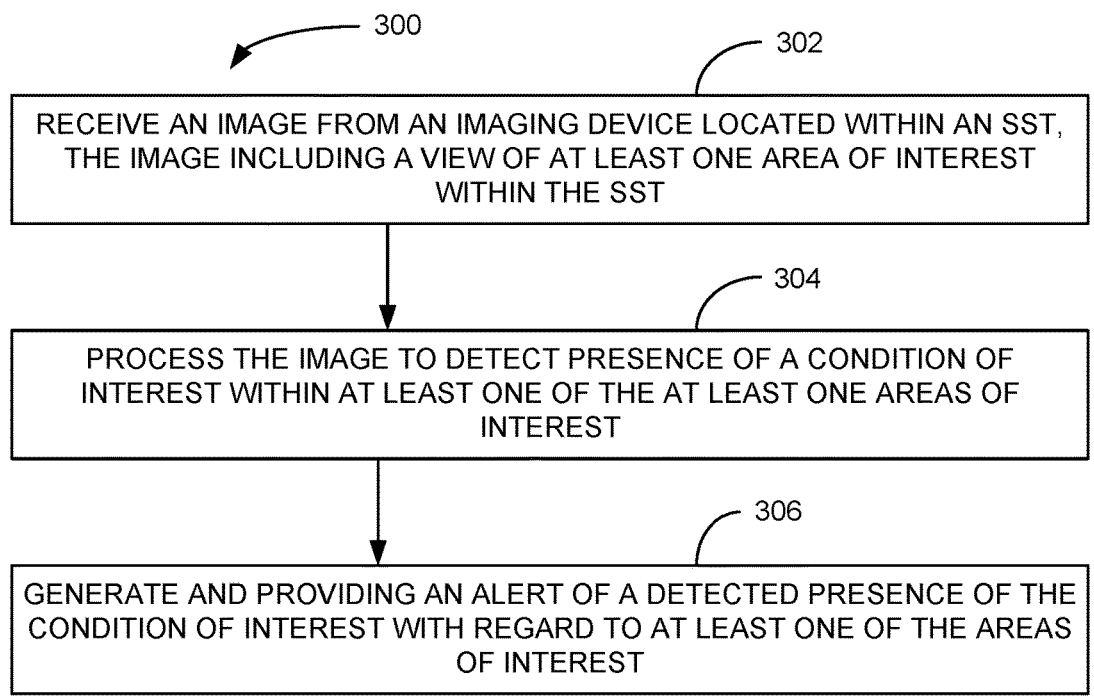
FIG. 3 is a block flow diagram of a method, according to an example embodiment.

FIG. 3 is a block flow diagram of a method 300, according to an example embodiment. The method 300 is an example of a method that may be performed by and executed on the computer 116 of FIG. 1 to process images captured by the camera 114 to identify conditions of interest.

The method 300 includes receiving 302 an image from an imaging device located within an SST where the image includes a view of at least one area of interest within the SST, such as one or more of the areas 105, 107, 109, 111, 113 of FIG. 1. The method 300 then processes 304 the image to detect presence of a condition of interest within at least one of the at least one areas of interest. When the processing 304 of the images does detect the present of a condition of interest, the method 300 includes generating 306 and providing an alert of the detected presence of the condition of interest with regard to at least one of the areas of interest. In some embodiments, the condition of interest is at least condition defined by a stored data definition of at least image characteristic that the processing of the image searches for in the received image. In one such embodiment, the stored data definition of at least one image characteristic includes at least one reference image representative of a condition of interest.

In some embodiments of the method 300, the alert of the detected presence of the condition of interest is provided as an output signal via an output device of the SST when the SST is being serviced, such as via a display device (i.e., a monitor or touchscreen), illuminating an indicator light or outputting an audio signal via a speaker or other audio output device, and the like.

In some embodiments of the method 300, the condition of interest is a presence of an item in a reject bin of the SST, a presence of an inconsistent media stacking within a media cassette of the SST, and the like. In some such embodiments, the alert of the detected presence of the inconsistent media stacking condition within a media cassette of the SST is provided to a process that executes on a computer controlling operation of the SST with an identification of the media cassette for which the inconsistent media stacking condition was detected. In such embodiments, the process that executes on the computer controlling operation of the SST, in response to the alert with regard to the identified media cassette, takes the media cassette offline to prevent the detected inconsistent media stacking condition from causing a jam within the SST when dispensing media.

Figure 4:
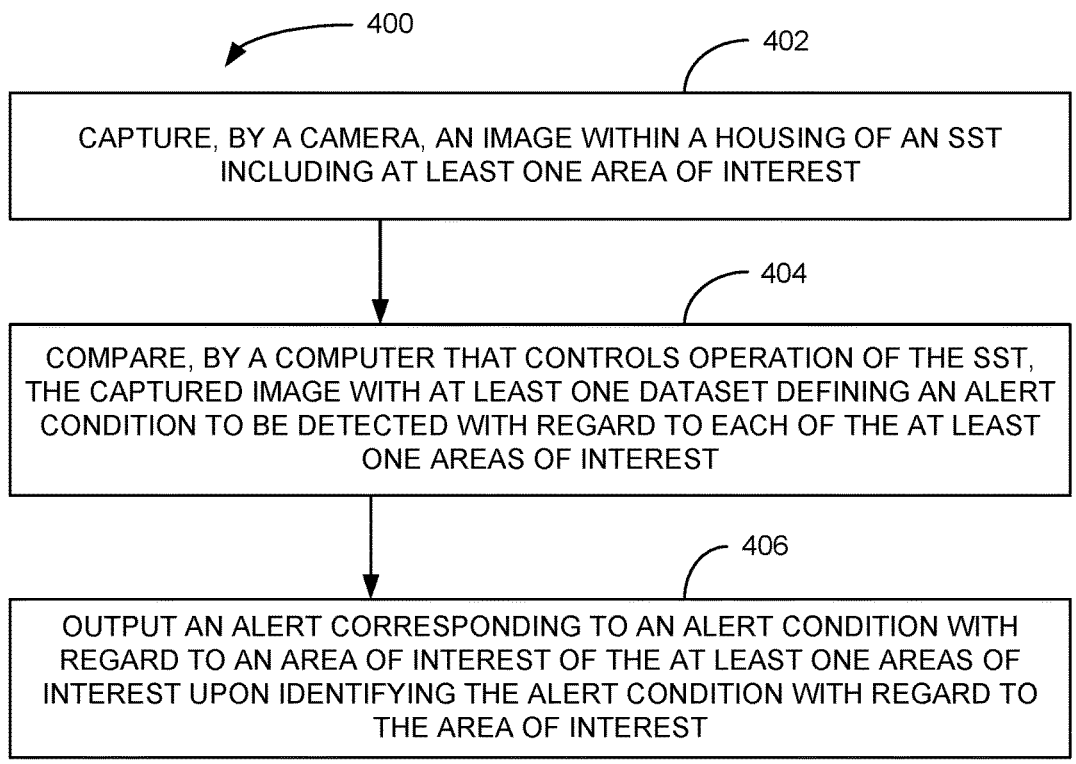
FIG. 4 is a block flow diagram of a method, according to an example embodiment.

FIG. 4 is a block flow diagram of a method 400, according to an example embodiment. The method 400 is another example of a method that may be performed by and executed on the computer 116 of FIG. 1 to process images captured by the camera 114 to identify conditions of interest.

The method 400 includes capturing 402, by a camera, an image within a housing of an SST including at least one area of interest. The method 400 then compares 404, by a computer that controls operation of the SST, the captured image with at least one dataset defining an alert condition to be detected with regard to each of the at least one areas of interest. Upon identifying the alert condition with regard to the area of interest, the method 400 includes outputting 406 an alert corresponding to an alert condition with regard to an area of interest of the at least one areas of interest.

In some embodiments, the method 400 is performed while the SST is being serviced or upon closure of the SST housing and before the SST is brought into service following closure of the SST housing. The alert may be output via at least a display device of or coupled to the SST to inform of the alert condition.

In some embodiments of the method 400, the condition of interest is a presence of an inconsistent media stacking within a media cassette of the SST. An inconsistent media stacking may be a lack of alignment of media within the cassette, the present of one or more band around bundles of media items such as currency or postage, present of foreign matter within or near a media stack, and the like. The alert of the detected presence of the inconsistent media stacking condition may be provided in some such embodiments by a process that executes on the computer controlling operation of the SST to an another process that executes on the computer controlling operation of the SST with an identification of the media cassette for which the inconsistent media stacking condition was detected. In some such embodiments, in response to the alert with regard to the identified media cassette, the process that executes on the computer controlling operation of the SST takes the media cassette offline to prevent the detected inconsistent media stacking condition from causing a jam within the SST when manipulating media.

In some further embodiments of the method 400, the media cassette of the SST is a currency cassette adapted to provide a view of currency housed therein to the camera when capturing the image. The media cassette, as described above with regard to FIG. 1, is adapted to provide the view of the currency housed therein by comprising at least a portion of transparent material or an opening to provide the view.

In some further embodiments of the method 400, the area of interest is a reject bin into which items are placed by the SST upon a detected error condition. Further, the comparing 404 of the captured image with the at least one dataset defining the alert condition includes an expected image that is compared to the captured image to identify any differences, wherein identification of a difference is an alert condition that something has been placed in the reject bin that is to be removed.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   activating a lighting element to illuminate at least one area of interest within an interior of a Self-Service Terminal (SST) when the SST is in a closed state;
   capturing an image by an imaging device including a view of the at least one area of interest within the interior of the SST while the lighting element is activated and when the SST is in a closed state, the at least one area of interest including a view of a media cassette;
   processing the image to detect presence of a condition of interest within at least one of the at least one areas of interest within the interior of the SST as present within the image; and
   generating and providing an alert of a detected presence of the condition of interest with regard to at least one of the areas of interest within the interior of the SST as present within the image.

2. The method of claim 1, wherein the condition of interest is at least condition defined by a stored data definition of at least image characteristic that the processing of the image searches for in the received image.

3. The method of claim 2, wherein the stored data definition of at least one image characteristic includes at least one reference image representative of a condition of interest.

4. The method of claim 1, wherein the alert of the detected presence of the condition of interest is provided as an output signal via an output device of the SST when the SST is being serviced.

5. The method of claim 1, wherein the condition of interest is a presence of an item in a reject bin of the SST.

6. The method of claim 1, wherein the condition of interest is a presence of an inconsistent media stacking within a media cassette of the SST.

7. The method of claim 6, wherein:
   the alert of the detected presence of the inconsistent media stacking condition within a media cassette of the SST is provided to a process that executes on a computer controlling operation of the SST with an identification of the media cassette for which the inconsistent media stacking condition was detected; and
   the process that executes on the computer controlling operation of the SST, in response to the alert with regard to the identified media cassette, takes the media cassette offline to prevent the detected inconsistent media stacking condition from causing a jam within the SST when dispensing media.

8. The method of claim 5, wherein the media cassette is a currency cassette and the media within the media cassette is currency.

9. The method of claim 8, wherein the SST is an Automated Teller Machine (ATM).

10. A method comprising:
    activating a light element within a housing of a Self-Service Terminal (SST), when the housing is in a closed state, to illuminate at least one area of interest within an interior of the SST, the at least one area of interest including a view of a media cassette;
    capturing, by a camera, an image within the housing of the SST, when the housing of the SST is in the closed state, including the at least one area of interest within the interior of the SST;
    comparing, by a computer that controls operation of the SST, the captured image with at least one dataset defining an alert condition to be detected with regard to each of the at least one areas of interest within the interior of the SST; and
    outputting an alert corresponding to an alert condition with regard to an area of interest within the interior of the SST of the at least one areas of interest within the interior of the SST upon identifying the alert condition with regard to the area of interest within the interior of the SST.

11. The method of claim 10, wherein the method is performed while the SST is being serviced or upon closure of the SST housing and before the SST is brought into service following closure of the SST housing.

12. The method of claim 11, wherein the alert is output via at least a display device of or coupled to the SST to inform of the alert condition.

13. The method of claim 11, wherein:
    the condition of interest is a presence of an inconsistent media stacking within a media cassette of the SST;
    the alert of the detected presence of the inconsistent media stacking condition is provided by a process that executes on the computer controlling operation of the SST to another process that executes on the computer controlling operation of the SST with an identification of the media cassette for which the inconsistent media stacking condition was detected; and
    in response to the alert with regard to the identified media cassette, the process that executes on the computer controlling operation of the SST takes the media cassette offline to prevent the detected inconsistent media stacking condition from causing a jam within the SST when manipulating media.

14. The method of claim 13, wherein the media cassette of the SST is a currency cassette adapted to provide a view of currency housed therein to the camera when capturing the image.

15. The method of claim 14, wherein the media cassette is adapted to provide the view of the currency housed therein by comprising at least a portion of transparent material to provide the view.

16. The method of claim 11, wherein:
    the area of interest is a reject bin into which items are placed by the SST upon a detected error condition; and
    the comparing of the captured image with the at least one dataset defining the alert condition includes an expected image that is compared to the captured image to identify any differences, wherein identification of a difference is an alert condition that something has been placed in the reject bin that is to be removed.

17. A Self-Service Terminal (SST) comprising:
    at least one media cassette to hold media to be dispensed from the SST, each of the at least one media cassettes providing a view of media when held therein;
    an imaging device positioned within the SST to capture images of a field of view including a view of media held within each of the at least one media cassettes while the media is held within a respective media cassette;

a lighting element to illuminate a field of view of the imaging device;

an area of interest monitoring process stored in a memory of a computer controlling operation of the SST, the area of interest monitoring process executable by a processor of the computer to perform data processing activities comprising:

illuminating the lighting element;

capturing an image with the imaging device;

receiving the image from the camera when a housing of the SST is in a closed state;

processing the image to detect presence of a media stacking condition of interest within at least one of the at least one media cassettes; and generating and providing an alert of a detected presence of the condition of interest with regard to at least one of the at least one media cassettes.

18. The SST of claim 17, wherein the alert is output via an output device of the SST when the media stacking condition is detected while the SST is being serviced.

19. The SST of claim 17, wherein the at least one media cassette comprises a currency cassette.

20. The SST of claim 17, wherein the SST is an Automated Teller Machine (ATM).

* * * * *